Lakin & Wains.
Spinning Mule.

N°42,048.

Sheet 1-2 Sheets.

Patented Mar. 22, 1864.

Witnesses,
Adam Atkinson
John Thompson

Inventors,
Robert Lakin
John Wain

Lakin & Wains.
Spinning Mule.
N°42,048. Patented Mar. 22, 1864.
Sheet 2 - 2 Sheets.
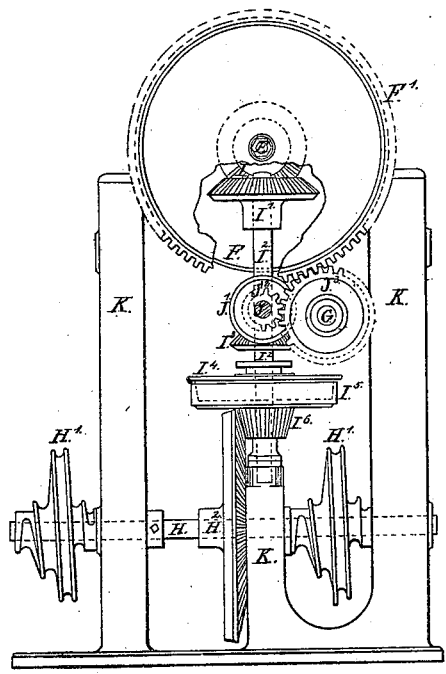
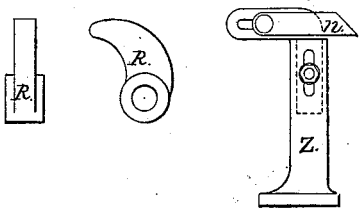
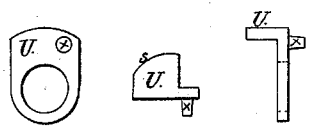
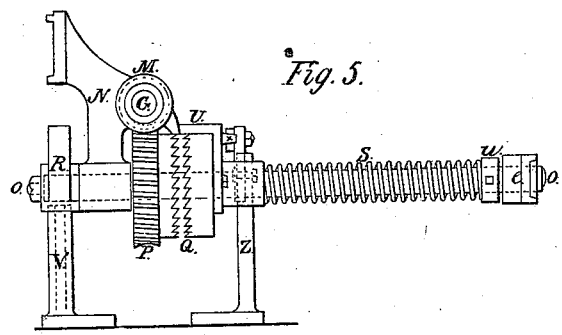
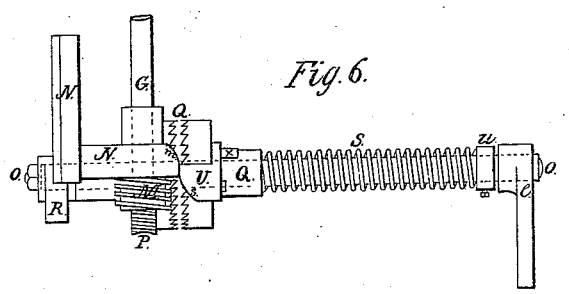
Witnesses,
Adam A. Hinton
John Thompson
Inventors,
Robert Lakin
John Wain

UNITED STATES PATENT OFFICE.

ROBERT LAKIN, OF ARDWICK, AND JOHN WAIN, OF MANCHESTER, ASSIGNORS TO MATTHEW CURTIS, OF MANCHESTER, ENGLAND.

IMPROVEMENT IN SELF-ACTING MULES.

Specification forming part of Letters Patent No. 42,048, dated March 22, 1864.

*To all whom it may concern:*

Be it known that we, ROBERT LAKIN, of Ardwick, in the county of Lancaster, machinist, and JOHN WAIN, of the city of Manchester, mechanic, subjects of the Queen of Great Britain, have invented or discovered new and useful improvements in machines for spinning and for doubling cotton and other fibrous materials; and we, the said ROBERT LAKIN and JOHN WAIN, do hereby declare the nature of the said invention, and in what manner the same is to be performed, to be particularly described and ascertained in and by the following statement thereof, that is to say—

First. In improved mechanism for regulaing the winding-on motion in mules and twiners, when constructed with the radial arm and screw, which in Great Britain is known as an improvement made by one Richard Roberts and embodied in what is termed the "Roberts' mule."

Secondly. In an improved arrangement and combination of mechanism in mules and twiners, whereby motion may be given from a shaft placed below the rim-shaft to the scrolls or equivalent therefor, which draw in the carriage, to the backing-off wheel, and also to the change-shaft and through it to the cam-shaft thereon. This shaft has attached to it a wheel which gears with and receives motion from a wheel attached to the pulley, usually called the "loose" or "self-acting" pulley.

Thirdly. In the application of a spring or brake to prevent the rotation of the winding-on barrel or drum in mules constructed on the principle of Roberts' mules during a short period before the carriage has completed its outward run, and also after the carriage has commenced its inward run, and thereby to allow an interval between the commencement of the inward run and the commencement of the winding on.

Fourthly. In the application of a catch-box and incline, in combination with a snail and other suitable parts for the purpose of moving the mule-carriage inward at a slow rate, while twisting at the head, the motion being determined by the form of the snail, which acts when the catch-box is in gear, the time of which is regulated by the incline.

Figure 1:
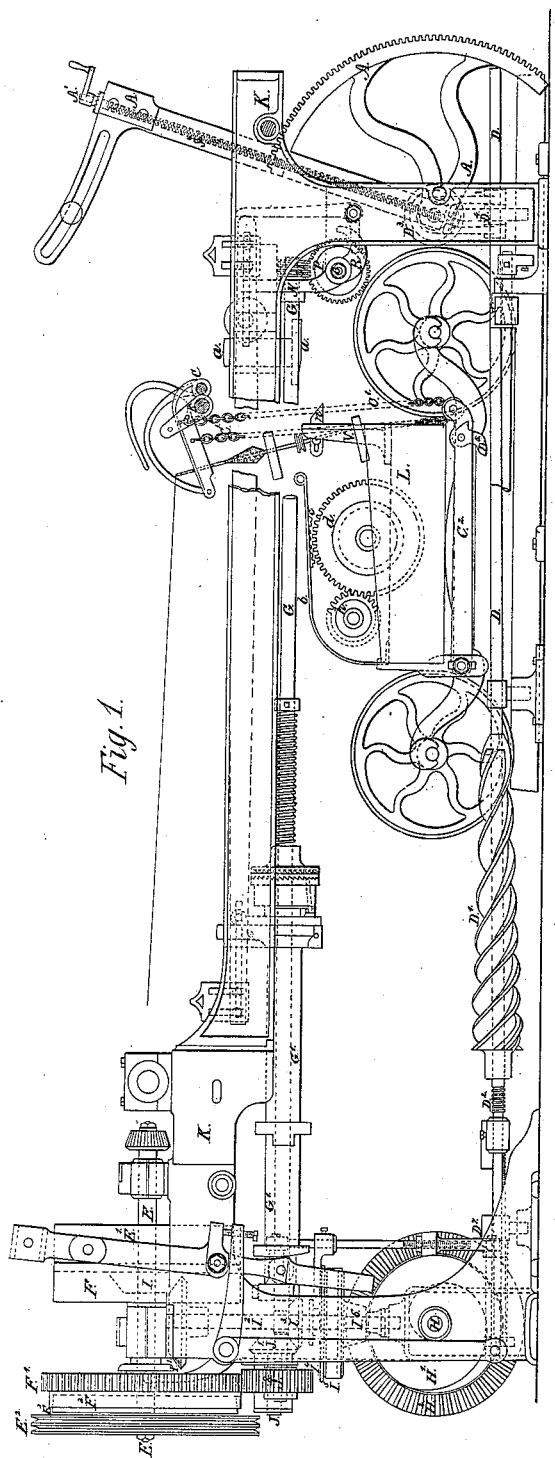
Figure 3:
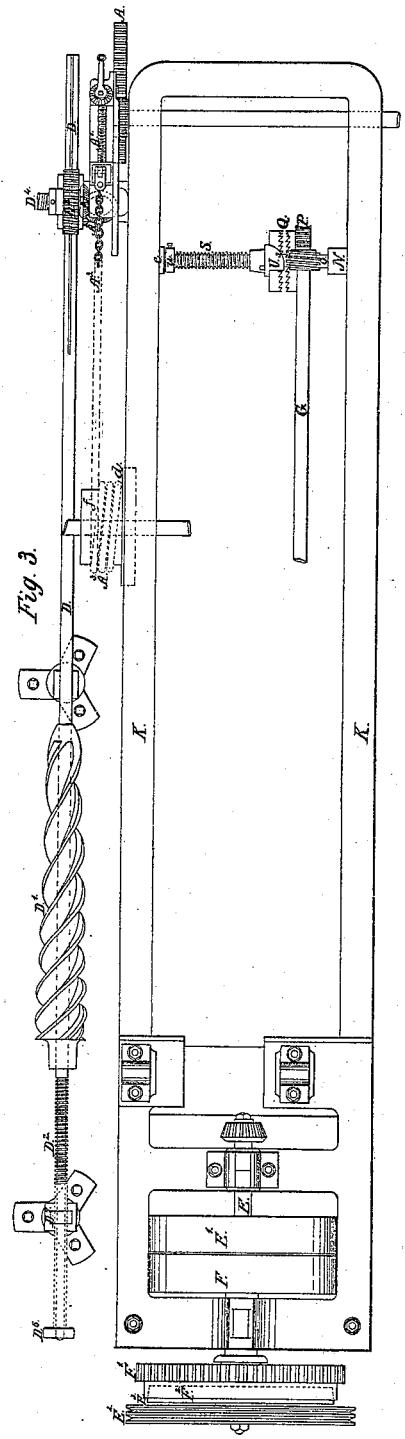
Figure 4:
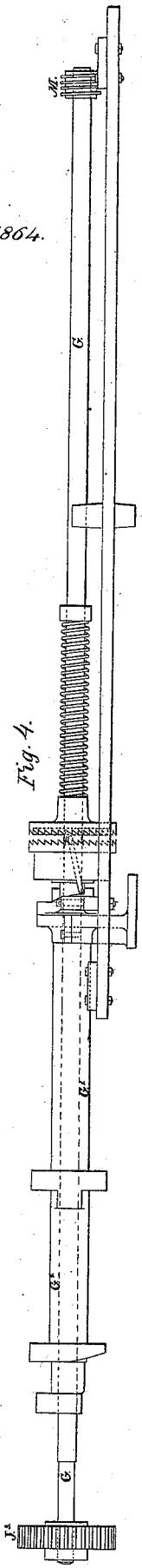

In the annexed drawings, Figure 1 is a side elevation, Fig. 2 an end elevation, and Fig. 3 a plan, of so much or of such parts of a mule or twiner as is requisite for the explanation of our invention, and in which the carriage is supposed to be going out. Figs. 4, 5, 6, 7, 8, and 9 are detached views.

Figs. 1, 2, and 3 are drawn to a scale of two inches equal one foot, the other figures to a scale of three inches equal one foot.

The following parts are well known and in general use as parts of the Roberts' spinning, mule, and therefore do not require to be particularly described, viz: The quadrant or radial arm A, with its screw A' and wheels $A^2$ for turning the screw; also, the winding-on chain $A^3$, attached at one end to the barrel $f$, and at the other to the nut $A^5$ on the screw of the radial arm A, and also the faller B and counter-faller C, to fingers on which are attached the two ends of the chain C', which passes under a pulley near the end of the lever $C^2$, which lever turns on an axis fixed on the carriage-square L.

In carrying out the first part of the invention we employ in connection with the radial arm A and its screw A' a shaft, D, on which is fixed a drum of a slightly conical or sugar-loaf form, on which are the spiral threads D'. It has also at one end the screw $D^2$, and near the other end it has on it the skew-wheel $D^4$, which is connected with the shaft D by means of a feather-key and groove, arranged to allow the shaft to move endwise in either direction without the wheel, but so as to compel the shaft and wheel, when the shaft rotates, to do so together. The shaft is supported by suitable bearings, one near each end and one near the middle. The catch $D^5$ is supported on a stud in the lever $C^2$. The lower part of this catch is slightly rounded, so as readily to engage with one of the spiral threads D' when required. The spiral threads D' are formed at a more obtuse angle at the commencement, to allow the catch $D^5$ to enter and engage with them, and as the spiral threads proceed they are formed more acute, as shown in the drawings. When commencing winding on the bare spindle, the screw A' is turned to bring the nut $A^5$ down to near the bottom of the screw, and the shaft D is so arranged that it will be turned by the same motion, so as to bring the bowl $D^6$ on the end of the screw nearly up to the bearing $D^7$, and being so turned the spiral threads D' will be moved in the direction of the radial arm, so that by being in this position the catch D$^5$ sooner engages with and can operate on the threads D' for the greatest length of time. When the winding of the yarn or threads onto the spindles proceeds at a proper rate for taking up the thread or yarn and at an even tension, the counter-faller remains in such a position, as by means of the chain C', acting on the lever C$^2$, the catch D$^5$ is so far elevated as not to come in contact with any of the spiral threads D'; but when the winding on of the yarn becomes too tight the tension of the yarn (as is well known) acts on and depresses the counter-faller, which allows the chain and lever to descend together with the catch D$^5$, and which, if sufficiently depressed, will during the run-in of the carriage come in contact with one of the spiral threads D', and as the carriage proceeds inward the catch D$^5$, acting on the thread D', with which it has come in contact, will turn it (the shaft D) and the skew-wheel D$^4$, which, through the skew-wheel D$^3$ and wheels A$^2$, will turn the screw A' and raise the nut A$^5$, by which means the winding on (as is well known) will be diminished. When the shaft D is turned, the screw D$^2$ (which passes through a stationary nut in the bearing D$^7$) will be drawn endwise in the direction of the inward run of the carriage, and with it the spiral threads D', and thus a smaller portion of the spiral threads will, at successive periods, be exposed to the action of the catch D$^5$ as the carriage runs in. As the spiral threads D', at the time they are drawn inward by the screw D$^2$, also descend according to the obliquity of the shaft D, a greater depression of the lever C$^2$ becomes necessary to permit the catch D$^5$ to bear against any of the spiral threads D', whereby less variation will be effected.

We will now explain the second of our improvements. E is the rim-shaft, on which are fixed the fast pulley E, rim-pulley E$^2$, and the cone-pulley E$^3$, and loose on which are the loose or self acting pulley F and the backing-off wheel F', on one side of which is the usual internal cone, F$^2$, formed to correspond with the cone of the pulley E$^3$. The shaft G is called the "change-shaft." On it is mounted the hollow cam-shaft G'. H is the scroll-shaft, on which are fastened the scrolls H' and wheel H$^2$.

The foregoing being well known and in extensive use, we have no need to describe their action or to state how the backing-off cones E$^3$ and F$^2$ and the halves of the friction-box I$^4$ and I$^5$ are taken out of or put into contact with each other, they being merely introduced to show how by this part of our invention we communicate motion to them. To the loose pulley F, or on the boss of it, is cast or fixed the bevel-wheel I, which gears with the wheel I', fast on the upper end of the shaft I$^2$, on which shaft is also fast the bevel I$^3$. The upper part, I$^4$, of the friction-box slides on feather-keys fixed to the shaft I$^2$, which cause them to rotate together, and loose on the shaft I$^2$ is the lower part, I$^5$, of the friction-box, which has the wheel I$^6$ cast with or fixed to it. On the shaft J is fast the wheel J', which gears with and receives motion from the wheel I$^3$. Also, on the same shaft is fast the spur-pinion J$^2$, which gears with and gives motion to the spur-wheel J$^3$, fixed on the shaft G.

From the foregoing it will be seen that the shaft I$^2$ receives motion from the loose pulley F by means of the wheels I and I', and that the shaft I$^2$ causes motion to be given to the backing-off wheel F' and to the shaft G, and thence to the cam-shaft G', by means of the wheels I$^3$, J', J$^2$, and J$^3$, and to the scroll-shaft H by means of the two parts of the friction-box I$^4$ and I$^5$ and wheels I$^6$ and H$^2$. The shaft I$^2$ rotates at the foot in a step fitting in the framing K, and at the upper part it is supported by a bearing also attached to the framing. The shaft J is also supported by a bearing attached to the framing.

We will now describe the third of our improvements, in which $a$ is a bracket fastened to the framing K, and $b$ is a bent spring or brake attached to the carriage-square L, and which are the only parts newly applied. To the spring $b$ is attached the piece $c$, having notches or teeth in it, which, when the spring is depressed, engage with the teeth of the wheel $d$. To explain their use, we may observe that in mules constructed on Roberts' principle the chain A$^3$, used for winding on, is wound onto the barrel $f$ during the time the carriage runs out, in order to perform the operation of winding on, which it does by turning the barrel $f$ round, and with it the spur-wheel $d$, attached to it, and driving the spur-pinion $h$, fixed on the tin roller-shaft, by which means motion is given to the spindles in the ordinary manner. This operation, being so well known, need not further be described than merely to state that so soon as the carriage commences going in, the chain which was wound tight on the barrel during the outward run of the carriage causes the winding-on motion to be put in action. In some cases, more especially when spinning woolen yarn, the carriage requires to move inward for a short distance during the operation of performing what is termed "twisting" at the head, and during which period it is requisite that the parts used for winding on should not be in operation. To prevent this it is requisite that a portion of the winding-on chain should be left slack, and not wound up on the barrel $f$. This we accomplish by causing the bracket $a$ to be so fixed and so formed at the lower surface that at the time when the carriage, by its outward run, causes the spring $b$ to come in contact with it it will depress the spring on the wheel $d$, and thereby prevent its rotation, leaving the chain, which would have been wound on if the rotation of the barrel had not been stopped, slack, by which means the carriage can go inward until the chain becomes tight without the winding-on motion being put into operation. The bracket $a$ being adjustable on the frame side, it can be placed so as to come sooner or later into contact with the spring, and thus vary the amount of slack chain to the quantity required, taking care that, however far it is moved forward, the under side is long enough to prevent the spring rising until the time the winding-on motion is required to be put in operation.

We now proceed to describe our fourth improvement. The change-shaft G, which is extended to nearly the whole length of the head-stock, has on it the worm M, near which it is supported by the bracket N, fastened to the framing K. The shaft O extends across the head-stock, and is supported at one end by the bracket N and at the other by the bracket $e$, attached to the framing K. The worm M gears with and communicates motion to the wheel P, and to the half of the catch-box Q which is cast with or attached to the wheel. The other half of the catch-box, which we term the "sliding half," is at liberty to slide on a feather-key attached to the shaft O, but must rotate with it when the two halves of the catch-box Q are put into contact, which they are when required by the spiral spring S, which acts against the boss of the sliding half of the catch-box and the hoop $u$, attached to the shaft O. The snail R is fastened on the shaft O. To the sliding half of the catch-box Q is attached the plate U, having the incline $s$ on its outer edge and the stud $x$ on its side. The brackets V and Z are bolted to the carriage-square L. To the bracket Z is fixed the plate $n$, which is adjustable thereon. The snail R is shown detached in Fig. 7, the plate U in Fig. 8, and the bracket Z in Fig. 9. The beveled end of the plate $n$ must be so set that just before the carriage completes its outward run it will come in contact with the stud $x$ on the plate U, and so that by the time the carriage has completed its outward run it will have pushed the stud $x$, and with it the sliding half of the catch-box Q, so far round that the end of the plate U will have been carried past the end of the bracket N, against which it previously rested. When it has been so far carried round, the spring S will cause the sliding half of the catch-box Q to go into contact with the other half and they will rotate together, and with them the shaft O and snail R. As the snail R rotates, it comes in contact with the bracket V, and forces it and the carriage inward to the required distance. The distance the carriage is moved inward can be varied either by varying the form or size of the snail R, or by so setting the bracket V on the carriage-square that the snail may act on it at once when it is put in motion; or it can be set back so as to allow the snail to move a distance without being brought into contact. Motion is continued to the shaft O until the halves of the catch-box are taken out of contact, which they are by the incline $s$ of the plate U, which rotates with the catch-box during its rotation, coming in contact with the incline $m$ of the bracket N, which, being fixed, forces the incline $s$ and the sliding half of the catch-box Q outward, so that by the time the end of the plate U is brought to bear against the end of the bracket N the halves of the catch-box will be out of contact, and motion will cease to be given to the shaft O until the halves of the catch-box are again put in contact.

From the foregoing it will be seen that the halves of the catch-box are put in contact at the completion of each outward run of the carriage, and that the shaft O only makes one revolution each stretch.

Having thus described the nature of our said invention and the manner of performing the same, we would have it understood that we make no claim to any of the mechanical parts separately; but

We claim—

1. In combination with the radial arm A and screw A′ of a mule or twiner, the shaft D, the drum with the spiral threads D′, the screw $D^2$, and skew-wheel $D^4$, working with other parts for regulating the winding on, substantially as herein described.

2. The combination, in a mule or twiner, of the loose pulley F, the bevel-wheel I, the bevel-wheel I′, the shaft $I^2$, the bevel-wheel $I^3$, the friction-box $I^4$ $I^5$, the bevel-wheel $I^6$, the shaft J, the bevel-wheel J′, the pinion $J^2$, the wheel $J^3$, the shaft G, the scroll-shaft H, and wheel $H^2$, substantially as herein described.

3. The combination of the bracket or instrument $a$ on the framing K and the spring-brake $b$ on the mule-carriage with the wheel or gear $d$ of the mule-carriage, the same being to operate as and for the purpose substantially as herein described.

4. The combination and arrangement of the change-shaft G of a mule, the worm M, the shaft O, the wheel P, the clutch-box Q, the spring S, the hoop $u$, the snail R, the plate U, the incline $s$, the stud $x$, the plate $n$, and the brackets V and N, for moving a mule-carriage, substantially as herein described.

ROBERT LAKIN.
JOHN WAIN.

Witnesses:
  ADAM ATKINSON,
    10 *Butler Street, Gumbeys,*
                               *Manchester.*
  EDWIN KIDD,
    22 *Higher Ardwick, Manchester.*